United States Patent Office 3,506,103
Patented Apr. 14, 1970

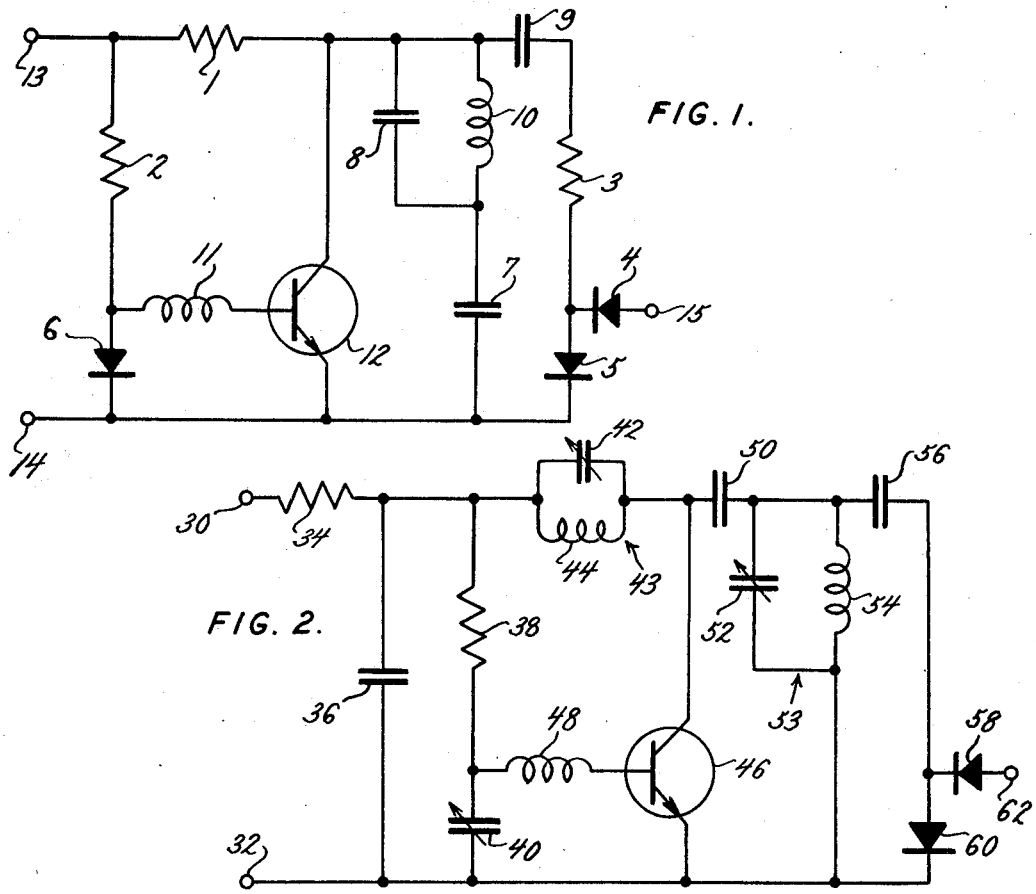
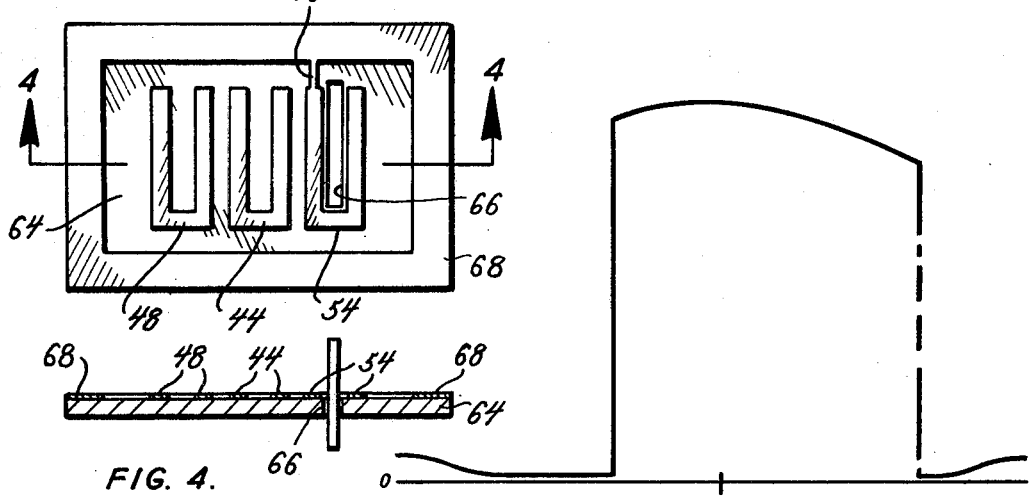
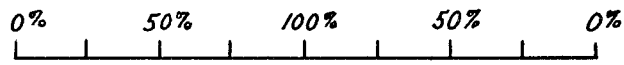

3,506,103
COIN TESTER USING ELECTROMAGNETIC
RESONANT FREQUENCY
Alexander Kückens, Hamburg, and Wolfgang Niehaus, Hamburg-Neugraben, Germany, assignors to Alexander Kückens, Hamburg, Germany
Continuation-in-part of application Ser. No. 552,501, May 24, 1966. This application June 11, 1968, Ser. No. 736,077
Int. Cl. G07f 3/02
U.S. Cl. 194—100          24 Claims

ABSTRACT OF THE DISCLOSURE

The dimensions of, the mass of, the surface configurations of, and the metallic nature of a coin determine the electromagnetic resonant frequency of that coin. When a coin is caused to resonate at its electromagnetic resonant frequency, that coin can cause an oscillator—which normally oscillates at a frequency displaced from, but relatively close to, the electromagnetic resonant frequency of that coin—to oscillate at the electromagnetic resonant frequency of that coin and thus provide a predetermined change in an electrical parameter of that oscillator.

---

This is a continuation-in-part of our copending application Ser. No. 552,501 for Money-Handling Devices which was filed May 24, 1966.

This invention relates to improvements in money-handling devices. More particularly, this invention relates to improvements in coin-testing devices.

It is, therefore, an object of the present invention to provide an improved coin-testing device.

Coin-testing devices are known which test the thicknesses of coins, which test the surface configurations of coins, and which test the weights of coins. Each of those tests is customarily performed at a separate testing station of a coin-testing device; and hence a coin-testing device which tests the thickness, surface configuration and weight of an inserted coin usually has several testing stations.

Coin-testing devices also are known which use magnets to develop eddy currents in coins and thus retard the speeds of movement of those coins, thereby changing the trajectories of those coins. In addition, testing mechanisms for coins of magnetic material are known. The coin-testing devices that include magnets which develop the eddy currents usually require an additional testing station; and the coin-testing devices that include mechanisms for testing magnetic coins usually require a further testing station.

This means that if a coin-handling device utilized standard and usual mechanisms and techniques and was devised to test inserted coins, to accept authentic coins of certain denominations, to reject spurious coins and coins not of those denominations, to register the values of accepted coins, to be capable of accepting magnetic or non-magnetic coins, to automatically return inserted coins when the power is off, and to register the value of coins of different denominations irrespective of the sequence in which those coins are inserted, a complex and bulky coin-handling device would result. Moreover, such a coin-handling device might well be sensitive to changes in temperature and to variations in the value of the line voltage. For example, where the testing of coins is done inductively or capcitively, the value of the line voltage must be closely regulated if precise testing is to be attained.

Where an electronic test of a coin is to be made, inductive interference, stray interference or mechanical interference from the outside must be prevented. Furthermore, care must be taken so the frequencies used in making the test do not fall into undesirable frequency ranges.

The present invention provides an electronic coin-testing device which is largely insensitive to changes in temperature and to variations in line voltage. Furthermore, that electronic coin-testing device is largely free from inductive interference, stray interference, or mechanical interference. In addition, the frequencies used in that coin-testing device do not fall into undesirable frequency ranges. Moreover, the electronic coin-testing device provided by the present invention simultaneously tests for the dimensions, the surface configuration, the metallic nature, and the mass of the inserted coin. As a result, the coin-testing device provided by the present invention is effective but is compact in size.

The present invention tends to cause an inserted coin to resonate at its electromagnetic resonant frequency; and then permits that coin to interact with an oscillator. If that oscillator begins to oscillate at the electromagnetic resonant frequency of that coin, a predetermined change will occur in an electrical parameter of that oscillator which will cause that coin to be accepted; but if that oscillator does not begin to oscillate at the electromagnetic resonant frequency of that coin, the said predetermined change will not occur in the said electrical parameter and that coin will not be accepted. Because the electromagnetic resonant frequency of a coin is dependent upon the dimensions, the mass, the surface configuration, and the metallic nature of that coin, the use of a coin, which is resonating at its electromagnetic resonant frequency, to cause an oscillator—which normally oscillates at a frequency displaced from, but relatively close to, the electromagnetic resonant frequency of that coin—to oscillate at the electromagnetic resonant frequency of that coin—as provided by the present invention—enables one testing station to simultaneously provide a number of tests on a coin. It is, therefore, an object of the present invention to provide a coin-testing device which uses a coin, that is resonating at its electromagnetic resonant frequency to cause an oscillator—which normally oscillates at a frequency displaced from, but relatively close to, the electromagnetic resonant frequency of that coin—to oscillate at the electromagnetic resonant frequency of that coin, and thus simultaneously tests for the dimensions, the surface configuration, the mass, and the metallic nature of that coin.

Other and further objects and advantages of the present invention should become apparent from an examination of the drawing and accompanying description.

In the drawing and accompanying description two preferred embodiments of the present invention are shown and described but it is to be understood that the drawing and accompanying description are for the purpose of illustration only and do not limit the invention and that the invention will be defined by the appended claims.

In the drawing,

FIG. 1 is a circuit diagram of one preferred embodiment of electronic coin-testing device that is made in accordance with the principles and teachings of the present invention, FIG. 2 is a circuit diagram of a second preferred embodiment of electronic coin-testing device that is made in accordance with the principles and teachings of the present invention, FIG. 3 is a plan view of a circuit board on which the three coils of the embodiment of electronic coin-testing device shown in FIG. 2 are formed, FIG. 4 is a sectional view through the circuit board shown in FIG. 3, and it is taken along the plane indicated by the line 4—4 in FIG. 3, and FIG. 5 is a graph which shows how the voltage across the output of the embodiment of electronic coin-testing device shown in FIG. 2 varies as a coin passes through a slot in the circuit board shown in FIG. 3.

A coin resonates at its electromagnetic resonant frequency when the free electrons in, and adjacent to, the surface of that coin move and cause oscillatory currents to develop in, and adjacent to, the surface of that coin which have frequencies in, or close to, the gigahertz range. When a coin resonates at its electromagnetic resonant frequency, the atoms and molecules in that coin remain essentially static and thus keep the physical dimensions of that coin essentially unchanged; whereas when a coin resonates at its mechanical resonant frequency, the atoms and molecules in that coin move and cause one or more of the physical dimensions of that coin to recurrently change in oscillatory fashion. The mechanical resonant frequency of a coin usually is in the sonic or supersonic range, whereas the electromagnetic resonant frequency of a coin is in, or close to, the gigahertz range.

Referring to FIG. 1 in detail, the numerals 13 and 14 denote terminals which can be connected to a source of direct current; and the terminal 13 will be connected to the positive terminal of that source while the terminal 14 will be connected to the negative terminal of that source. An NPN transistor 12 has the collector thereof connected to the terminal 13 by a fifty-six hundred ohm resistor 1; and the emitter of that transistor is directly connected to the terminal 14. A thirty-three thousand ohm resistor 2 and a diode 6 are connected in series between the terminals 13 and 14, and thus are connected in parallel with the series-connected resistor 1 and the collector-emitter circuit of the transistor 12. A coil 11 is connected between the base of the transistor 12 and a junction intermediate the resistor 2 and the diode 6.

A capacitor 8 and a coil 10 are connected in parallel with each other to constitute a parallel-resonant tuned circuit; and a capacitor 7 connects that parallel-resonant tuned circuit in parallel with the collector-emitter circuit of the transistor 12. A capacitor 9, a fifty-six hundred ohm resistor 3, and diodes 4 and 5 of a voltage doubler couple the output of that parallel-resonant tuned circuit to an output terminal 15.

The resistor 2 and the diode 6 constitute a voltage divider which establishes the biasing voltage for the base of the transistor 12. The diode 6 is selected so its response to changes in temperature will compensate for any temperature-induced changes in characteristics of the transistor 12. As a result, the resistor 2 and the diode 6 constitute a base-biasing and stabilizing network.

The capacitors 8 and 7 act as a feed-back network between the collector and emitter of the transistor 12 to enable that transistor to function as an oscillator. Preferably the inductance of the coil 10 is three times the inductance of the coil 11. Preferably, the capacitance of the capacitor 7 is ten times the capacitance of the capacitor 8. Preferably, the capacitance of the capacitor 8 and the inductance of the coil 10 are selected so the parallel-resonant circuit, constituted by that coil and that capacitor, will resonate at a frequency relatively close to the electromagnetic resonant frequency of the coil which is to be accepted by the electronic coin-testing device. Where the electromagnetic resonant frequency of the coin is very high, a harmonic of the resonant frequency developed by the parallel-resonant circuit rather than that resonant frequency can be used.

The coil 11 and the coil 10 will be mounted adjacent a path for coins; but those coils will be shielded from each other to minimize mutual coupling between them. When a coin is inserted in the electronic coin-testing device provided by the present invention, that coin will initially pass through the coil 10 and will subsequently pass through the coil 11. As that coin passes through the coil 10, the resonant frequency of the parallel-resonant circuit, or a harmonic of that resonant frequency, will cause that coin to start resonating at its electromagnetic resonant frequency. That electromagnetic resonant frequency is a function of the dimensions, the surface configurations, the mass, and the metallic nature of that coin; and it will be distinctively different from the electromagnetic resonant frequencies of spurious coins and of authentic coins of different denominations.

That coin will continue to resonate at its electromagnetic resonant frequency as it passes through the coil 11; and it will act as a radiator and will transmit energy to that coil. That transmitted energy will be at the electromagnetic resonant frequency of the coin; and, if that coin is authentic and of the desired denomination, that transmitted energy will be relatively close to the resonant frequency, or relatively close to a harmonic of the resonant frequency of, the parallel-resonant tuned circuit. The coil 11 will respond to that transmitted energy to vary the base-emitter voltage, and hence the conductivity of the collector-emitter circuit, of the transistor 12; and the resulting amplified current variations will be applied in phase with the current in the parallel-resonant tuned circuit. As a resut, the amplitude of the current in the parallel-resonant tuned circuit will increase and will increase the amplitude of the voltage variations across the coil 10.

The capacitor 9, the resistor 3, and the diodes 4 and 5 will couple the increased amplitude voltage variations to the output terminal 15. The voltage doubler, of which the diodes 4 and 5 are parts, will roughly double the values of the voltage variations across the coil 10. A utilization circuit can be connected to the output terminal 15 and to the cathode of the diode 5; and that circuit can effect acceptance of authentic coins of the desired denomination.

If a spurious coin or an authentic coin of undesired denomination is introduced into the electronic coin-testing device provided by the present invention, the coil 10 will impart energy to that coin as that coin passes through that coil. However, the electromagnetic resonant frequency of that coin will be distinctively different from the resonant frequency or a harmonic of the resonant frequency of the parallel-resonant tuned circuit. As a result, that spurious coin or authentic coin of undesired denomination may experience little or no electromagnetic resonance. Further, even if that coin does experience some electromagnetic resonance, it will resonate at a frequency which is quite different from the electromagnetic resonant frequency of an authentic coin of the desired denomination. When that spurious coin or authentic coin of undesired denomination subsequently passes through the coil 11, it may supply energy to the coil 11; but any resulting variations in conductivity of the transistor 12 will provide current variations that are out of phase with the current in the parallel-resonant tuned circuit. As a result, the amplitude of the current in the parallel-resonant tuned circuit will decrease; and the utilization circuit connected to the output terminal 15 will effect rejection of the inserted coin.

The electromagnetic resonant frequencies of different coins are distinctively different. For example, a ten lira Italian coin which is made from aluminum or an aluminum alloy has an electromagnetic resonant frequency of approximately one gigahertz, a ten pfennig German Democratic Republic coin which is made from aluminum or an aluminum alloy has an electromagnetic resonant frequency of approximately one and three hundred and two thousandths gigahertz, a two mark German Federal Republic coin which is made from copper and nickel has an electromagnetic resonant frequency of approximately one and eight tenths gigahertz, a one mark German Federal Republic coin which is made from copper and nickel has an electromagnetic resonant frequency of approximately two and nine-tenths gigahertz, a twenty-five cent United States coin which is made from coin silver has an electromagnetic resonant frequency of approximately four and one quarter gigahertz, and a ten cent Netherlands coin which is a silver alloy has an electromagnetic resonant frequency of approximately eighteen gigahertz. As a result, it is possible to select different coins by selecting different resonant frequencies for the parallel-resonant tuned circuit.

The utilization circuit will have a coin-returning element, not shown, associated with it; and that coin-returning element will normally be set in position to reject inserted coins and to return them to the patrons who inserted them. Only after a coin has been tested and found to be authentic will the utilization circuit cause that coin-returning element to be moved out of the path of that coin so that coin can pass to the cash box. This means that in the event the power is off, the coin-returning element will be in position to return inserted coins to the patrons who inserted them.

While just one oscillating circuit has been shown, a series of oscillating circuits could be associated with the same coin path. The coils of the various oscillating circuits would be tuned to the electromagnetic resonant frequencies of the coins which were to be accepted. Those oscillating circuits would be interconnected with the coin-returning element so if an inserted coin actuated any of the oscillating circuits, the coin-returning element would be moved out of the coin path so that coin could pass to the cash box. Furthermore, each oscillating circuit would be appropriately connected to a credit accumulating mechanism or to a vending mechanism responsive to the price corresponding to the coin to be sensed by that oscillating circuit.

It will be noted that the electronic coin-testing device provided by the present invention does not use any permanent magnets. This is desirable; because it enables that electronic coin-testing device to test magnetic, as well as non-magnetic, coins without having the magnetic coins come to rest in blocking position within that coin-testing device.

Referring to FIGS. 2–4 in detail, the numerals 30 and 32 denote terminals which can be connected to a source of direct current; and the terminal 30 will be connected to the positive terminal of that source, while the terminal 32 will be connected to the negative terminal of that source. A one hundred ohm resistor 34 and a two hundred and twenty nanofarad capacitor 36 are connected in series between the terminals 30 and 32; and that resistor and capacitor act as a filter to by-pass noise and other transients.

A twenty-two hundred ohm resistor 38 and a six picofarad adjustable capacitor 40 are connected in series with each other and in parallel with the capacitor 36; and a coil 48 connects the junction between that resistor and that capacitor to the base of an NPN transistor 46. That transistor is a Philips BFW 16 transistor. The emitter of that transistor is connected to the terminal 32; and the collector of that transistor is connected to the resistor 34 by a parallel-resonant tuned circuit 43 which includes a coil 44 and a ten picofarad trimmer capacitor 42.

The numeral 54 denotes a coil and the numeral 52 denotes a ten picofarad trimmer capacitor which coact to constitute a parallel-resonant tuned circuit 53; and the lower terminals of coil 54 and capacitor 52 are connected to the terminal 32. The upper terminals of that coil and capacitor are coupled to the collector of transistor 46 by a five and six tenths picofarad capacitor 50. A ten picofarad capacitor 56 and diodes 58 and 60 of a voltage doubler couple the output of the parallel-resonant tuned circuit 53 to an output terminal 62.

Resistor 38 acts as a biasing resistor, and thus establishes a normal base voltage for transistor 46. The coil 44 is located adjacent the coil 48 and will feed back sufficient energy from the collector circuit of the transistor 46 to the base circuit of that transistor to enable that transistor 46 to act as an oscillator. The coil 54 is located close enough to the coil 44 to enable energy to be interchanged between those coils. The coil 54 is formed to permit a coin to pass through it; and, in the preferred embodiment of electronic coin-testing device shown in FIG. 2, the coils 44, 48 and 54 are formed on the upper surface of a printed circuit board 64 which has a coin-receiving slot 66 through it. As shown particularly by FIGS. 3 and 4, the coils 44, 48 and 54 have the form of quarterwave length elements, those coils lie in the same plane, and the coil 54 is immediately adjacent the slot 66. A metallic border 68 is formed on the upper surface of the circuit board 64; and a reduced-width connection 70 extends between that boarder and the free end of the left-hand arm of the coil 54. The border 68 provides a partial shielding action, and also keeps the D.C. voltage of the coil 54 the same as the D.C. voltage of that border.

The left-hand terminal of trimmer capacitor 42, the right-hand terminal of resistor 34, and the upper terminals of resistor 38 and capacitor 36 are connected to the free end of the left-hand arm of the coil 44; and the collector of transistor 46 and the left-hand terminal of capacitor 50 are connected to the free end of the right-hand arm of that coil. The lower terminal of resistor 38 and the upper terminal of capacitor 40 are connected to the free end of the left-hand arm of the coil 48; and the base of the transistor 46 is connected to the free end of the right-hand arm of that coil. The lower terminal of capacitor 52 and terminal 32 are connected to the left-hand arm of coil 54 by means of the border 68; and the upper terminal of that capacitor, the right-hand terminal of capacitor 50, and the left-hand terminal of capacitor 56 are connected to the free end of the right-hand arm of that coil. The cathode of diode 60, the emitter of transistor 46, and the lower terminals of capacitors 36 and 40 are connected to the border 68, and thus to the terminal 32. All of the components of the electronic coin-testing device shown in FIG. 2 will be mounted on the printed circuit board 64 by means of the shortest possible leads—to hold the inductive and capacitive effects of those leads to a minimum.

To enable the electronic coin-testing device shown in FIG. 2 to distinguish between a given coin and other coins and slugs, the electromagnetic resonant frequency of that coin must be determined; and then a variable frequency oscillator must be adjusted to develop an output frequency corresponding to the electromagnetic resonant frequency of that coin. The capacitor 40 will then be adjusted until the oscillator—which includes transistor 46, parallel-resonant tuned circuit 43, and coil 48—does not oscillate; and then the output of that variable frequency oscillator is disposed adjacent to the printed circuit board 64. At such time, the trimmer capacitors 42 and 52 will be adjusted until the parallel-resonant tuned circuits 43 and 53 are tuned to that frequency. Because the coils 44 and 54 are close together, the adjustments of the trimmer capacitors 42 and 52 must be repeated several times.

After both of the parallel-resonant tuned circuits 43 and 53 have been tuned to the frequency developed by the variable frequency oscillator, that variable frequency oscillator will be deenergized. At such time, the capacitor 40 will be adjusted to set the output voltage between the output terminal 62 and the cathode of the diode 60. That capacitor serves as a sensitivity control; and it will be set to provide a voltage between output terminal 62 and the cathode of diode 60 of about one-half of a volt. While the capacitor 40 could be adjusted to provide voltages of from zero to one volt between the output terminal 62 and the cathode of diode 60, that capacitor is set to provide a value of one-half of a volt; because such a value enables the electronic coin-testing device to accept freshly-minted as well as well-worn coins of the desired denomination while rejecting all slugs and undesired coins.

A coin chute, not shown, will be mounted above the slot 66 in the printed circuit board 64 to conduct coins to that slot; and a branched coin chute, not shown, will be mounted below that coin slot. That branched coin chute will have a coin-directing element associated with it which can be controlled by a solenoid, electromagnet, or other device. Normally, that coin-directing element will be disposed to deflect coins, passing through that branched coin chute, so they will pass to and through a rejected coin chute; but that coin-directing element will respond to actuation of that solenoid, electromagnet, or other device to permit coins, passing through that branched coin chute, to pass to an accepted coin chute. An amplifier, not shown, will have the input thereof connected to the output terminal 62 and to the cathode of diode 60; and the output of that amplifier will be connected to a relay, not shown, which can energize the solenoid, electromagnet, or other device. That solenoid, electromagnet, or other device will leave the coin-directing element in coin-rejecting position as long as the voltage between the output terminal 62 and the cathode of diode 60 is below three volts; but that solenoid, electromagnet, or other device will shift that coin-directing element to coin-accepting position whenever the voltage between the output terminal 62 and the cathode of diode 60 rises above about three volts.

Whenever any coin or slug moves downwardly through the coin chute and begins to pass between the arms of the coil 54, the voltage between the output terminal 62 and the cathode of diode 60 will begin to drop. As shown by FIG. 5, that voltage will drop very quickly when the coin or slug begins to pass between the legs of that coil— that voltage dropping from an initial value of about one-half of a volt to a value of about eight-hundredths of a volt by the time that coin or slug has moved far enough downwardly between the arms of the coil 54 so those arms simulate chords of that coin or slug having lengths about twenty percent of the length of a diameter of that coin or slug. If the coin is an authentic coin of the desired denomination, and thus has an electromagnetic resonant frequency of the desired value, and if that coin is a freshly-minted coin, the voltage between the output terminal 62 and the cathode of diode 60 will remain at about eight-hundredths of a volt until that coin has moved far enough downwardly between the arms of the coil 54 to enable those arms to simulate chords of that coin having lengths approximately sixty percent of the length of a diameter of that coin. At that time, the voltage between the output terminal 62 and the cathode of the diode 60 will abruptly increase from about eight-hundredths of a volt to about six and seven-tenths of a volt. As that voltage exceeds three volts, the amplifier and relay will cause the solenoid, electromagnet, or other device to move the coin-directing element out of coin-rejecting position—thereby clearing the way for that coin to pass to the accepted coin chute. The relay will have a suitable RC network associated with it to make it a slow-to-open relay; and hence that relay will keep the solenoid, electromagnet, or other device energized long enough to enable the coin to pass beyond the coin-directing element before that solenoid, electromagnet, or other device is de-energized. As a result, the coin-directing element will not be able to keep the coin from passing to the accepted coin chute.

The voltage between the ouput terminal 62 and the cathode of diode 60 will increase to seven volts, as the geometric center of that coin moves between the arms of the coil 54; and then that voltage will decrease to about five and seven-tenths volts as that coin moves further downwardly between the arms of that coil. Specifically, the voltage between the output terminal 62 and the cathode of diode 60 will decrease to five and seven-tenths volts by the time the coin has moved far enough downwardly between the arms of the coil 54 to enable those arms to simulate chords having lengths of about thirty percent of the length of a diameter of that coin. Thereafter, the voltage between the output terminal 62 and the cathode of diode 60 will abruptly drop to about eight-hundredths of a volt; and, as that coin begins to move downwardly beyond the coil 54, the voltage between that output terminal and the cathode of that diode 60 will return to about one-half of a volt.

When a slug, or a coin which does not have an electromagnetic resonant frequency close to that of the desired coin, is introduced into the coin chute and is thus conducted to and into the coil 54, the voltage between the output terminal 62 and the cathode of diode 60 will drop from its initial value of about one-half of a volt to about eight-hundredths of a volt; and that voltage will remain at about eight-hundredths of a volt until the slug or coin has passed almost completely through that coil. As that slug or coin passes completely through that coil, the voltage between the output terminal 62 and the cathode of diode 60 will again rise to about one-half of a volt.

The sharp and very substantial voltage pulse indicated by FIG. 5 will not develop when a slug, or a coin which does not have an electromagnetic resonant frequency close to that of the desired coin, passes through the coil 54; and hence the voltage between the output terminal 62 and the cathode of diode 60 will not even begin to approach the value needed to cause the solenoid, electromagnet or other device to move the coin-directing element. As a result, that solenoid, electromagnet, or other device will leave that coin-directing element in coin-rejecting position; and hence the slug or coin will be directed to the rejected coin chute.

If the preferred form of electronic coin tester shown in FIG. 2 is to accept a coin, the normal resonant frequency of each of the parallel-resonant tuned circuits 43 and 53 should be higher than, but relatively close to, the electromagnetic resonant frequency of that coin; and that electronic coin tester must be able to develop enough ampere-turns in the coil 54 to cause each acceptable coin to start resonating at its electromagnetic resonant frequency. Where the components of that electronic coin tester have been dimensioned to enable that electronic coin tester to accept the ten pfennig German Democratic Republic coin—which has an electromagnetic resonant frequency of about one and three hundred and two thousandths of a gigahertz—the normal resonant frequency of each of the parallel-resonant tuned circuits 43 and 53 has been about one and thirty-five hundredths gigahertz, and that electronic coin tester has developed about two and two-tenths ampere-turns in the coil 54. The forty-eight megahertz difference between the one and thirty-five hundredths gigahertz normal resonant frequency of each of the parallel-resonant tuned circuits 43 and 53 and the one and three hundred and two thousandths of a gigahertz electromagnetic resonant frequency of the ten pfennig German Democratic Republic coin seems large, but the differences between the electromagnetic resonant frequency of the ten pfennig German Democratic Republic coin and the electromagnetic resonant frequencies of all known slugs and coins are much greater than forty-eight megahertz. Further, the forty-eight megahertz difference between the one and thirty-five hundredths gigahertz normal resonant frequency of each of the parallel-resonant tuned circuits 43 and 53 and the one and three hundred and two thousandths of a gigahertz electromagnetic resonant frequency of the ten pfennig German Democratic Republic coin is desirable because it enables the preferred form of electronic coin tester shown in FIG. 2 to accept well-worn, as well as freshly-minted, ten pfennig German Democratic Republic coins. As a result, the electronic coin tester provided by the present invention can accurately distinguish between acceptable coins and slugs and unacceptable coins, and yet accept well-worn, as well as freshly-minted, acceptable coins.

Every coin and slug will absorb energy from the parallel-resonant tuned circuit 53 as that coin or slug moves between the arms of the coil 54; and that absorption of energy will effectively increase the load on the oscillator— which includes transistor 46, parallel-resonant tuned circuit 43, and coil 48—with a consequent decrease in the voltage between the output terminal 62 and the cathode of diode 60. Specifically, where the normal voltage between the output terminal 62 and the cathode of diode 60 is about one-half of a volt, each coin or slug which moves between the arms of the coil 54 will cause that voltage to decrease to about eight-hundredths of a volt. Most slugs and unacceptable coins will continue to effectively increase the load on that oscillator, and thus will cause the voltage between the output terminal 62 and the cathode of diode 60 to remain below its normal value, as long as any appreciable width of that coin or slug is between the arms of the coil 54. Even if a slug or unacceptable coin were to be caused to start resonating at its electromagnetic resonant frequency, the electromagnetic resonant frequency of that slug or coin would be so different from the electromagnetic resonant frequency of an acceptable coin, that any rise in the voltage between the output terminal 62 and the cathode of diode 60 would be considerably less than three volts; and hence the solenoid, electromagnet or other device in the branched coin chute would remain un-energized and would permit the coin-directing element to remain in coin-rejecting position. Consequently, all known slugs and unacceptable coins will be rejected by the electronic coin tester of the present invention.

Acceptable coins will absorb energy from the parallel-resonant tuned circuit 53 as those coins move between the arms of the coil 54; and that absorption of energy will effectively increase the load on the oscillator—which includes transistor 46, parallel-resonant tuned circuit 43, and coil 48—with a consequent decrease in the voltage between the output terminal 62 and the cathode of diode 60. As a result, where the normal voltage between the output terminal 62 and the cathode of diode 60 is about one-half of a volt, each acceptable coin which moves between the arms of the coil 54 will cause that voltage to decrease to about eight-hundredths of a volt. However, after an acceptable coin has moved far enough downwardly between the arms of the coil 54—usually to a depth equal to a distance between one-quarter and one-half of a diameter of that coin—to absorb an appreciable amount of energy from the parallel-resonant tuned circuit 53, that coin will begin to resonate at its electromagnetic resonant frequency. The atoms and molecules of that coin will remain essentially static relative to each other, and hence the physical dimensions of that coin will remain static; but the free electrons in, and adjacent to, the surface of that coin will move and cause oscillatory currents to develop in, and adjacent to, that surface which are in, or close to, the gigahertz range. Those oscillatory currents will simulate the oscillatory currents in a tuned circuit, and some of the electromagnetic energy from those oscillatory currents will interact with the electromagnetic energy from the parallel-resonant tuned circuit 53.

The electromagnetically-resonating coin increases the impedance of the parallel-resonant tuned circuit 53; and that increase in impedance is coupled to or is reflected into the parallel-resonant tuned circuit 43—with a consequent increase in the voltage drop across the coil 44. Because coils 44 and 54 are effectively connected in parallel, in respect to alternating current, the increase in the voltage drop across the coil 44 causes the voltage drop across the coin 54 to increase; and the latter increase in voltage drop produces the sharp voltage pulse shown by FIG. 5.

An acceptable coin will continue to resonate at its electromagnetic resonant frequency, as it continues to move downwardly between the arms of the coin 54, until the width of the upper portion of that coin which remains between those arms is less than about one-third of the length of a diameter at that coin. As long as that coin continues to resonate at its electromagnetic resonant frequency, some of the electromagnetic energy from the oscillatory currents in, and adjacent to, the surface of that coin will interact with the electromagnetic energy from the parallel-resonant tuned circuit 53—although the smaller widths of the upper portions of that coin which remain between the arms of the coil 54 will reduce the extent of interaction. This means that the voltage between the output terminal 62 and the cathode of diode 60 will remain well above the three volt level—and, in the case of a ten pfennig German Democratic Republic coin, will remain above five and six-tenths volts—until the coin stops resonating at its electromagnetic resonant frequency. As that coin stops resonating at its electromagnetic resonant frequency, the voltage between the output terminal 62 and the cathode of diode 60 will promptly drop to about eight-hundredths of a volt, and subsequently will rise to about one-half of a volt as that coin moves wholly below the arms of coil 54.

Freshly-minted coins respond to energy from the parallel-resonant tuned circuit 53 to begin resonating at their electromagnetic resonant frequencies sooner than do well-worn coins of the same denomination. For example, a freshly-minted coin will usually begin to resonate at its electromagnetic resonant frequency well before the geometric center of that coin moves downwardly between the arms of the coil 54, whereas a well-worn coin usually will not begin to resonate at its electromagnetic resonant frequency until its geometric center is almost between the arms of that coil. However, even well-worn coins will begin to resonate at their electromagnetic resonant frequencies as long as those coins are not worn so badly that the engraving thereon cannot be readily discerned. When a well-worn ten pfennig German Democratic Republic coin does begin to resonate at its electromagnetic resonant frequency, the voltage between the output terminal 62 and the cathode of the diode 60 will rise to a level at least as high as five volts, and thus to a level which is well above the threshold level at which the solenoid, electromagnet or other device will move the coin-directing element out of coin-rejecting position. Consequently, even well-worn coins can be accepted by the electronic coin-testing device provided by the present invention as long as the engravings on those coins are readily discernible.

It is possible to interpose a shield between the coils 44 and 54, and thus limit the transference of energy between the parallel-resonant tuned circuits 43 and 53 to the energy which can be transferred by the capacitor 50. However, the sensitivity of the electronic coin-tester shown in FIG. 2 is much greater where the coils 44 and 54 are in close proximity and are not shielded from each other. Further, fewer parasitic oscillations are noted where the coils 44 and 54 are in close proximity and are not shielded from each other.

The electromagnetic resonant frequency of a coin is a function of the dimensions, the mass, the surface configurations, and the metallic nature of that coin. The surface configurations at, and immediately adjacent to, the peripheries of coins appear to have more effect upon the electromagnetic resonant frequencies of those coins than do the surface configurations at, and immediately adjacent to, the geometric centers of those coins. The electromagnetic resonant frequency of a coin which is an alloy of two metals appears to be higher than the electromagnetic resonant frequency of a coin which is made wholly from either of those metals. The electromagnetic resonant frequency of a coin can not, at the present time, be calculated; and, instead, must be determined by use of a variable frequency oscillator which can develop an output signal in, or close to, the gigahertz range. Since variable frequency oscillators of that type are far from common, it would be difficult for unscrupulous persons to select coins and slugs which might have electromagnetic resonant frequencies close to the electromagnetic resonant frequency of an acceptable coin.

The electronic coin tester provided by the present invention can distinguish between coins which have substantially the same diameter, substantially the same thickness, substantially the same mass, and substantially the same metallic nature but which differ in the external appearance thereof. For example, the electronic coin-testing device shown in FIG. 2 developed a voltage pulse which generally corresponded to the sharp voltage pulse shown in FIG. 5 when a one mark German Federal Republic coin passed through the slot 66, but merely experienced a reduction in output voltage from about one-half of a volt to about eight-hundredths of a volt when a one shilling British coin passed through that slot—although both of those coins have substantially the same diameter, substantially the same thickness, substantially the same mass, and are made with about seventy-five percent copper and twenty-five percent nickel. The principal differences between those coins reside in the fact that the one mark coin has a smooth periphery and an engraving of a predetermined nature, while the one shilling coin has a milled periphery and a different engraving. The ability to develop a voltage pulse which can distinguish a one mark German Federal Republic coin from a one shilling British coin makes the electronic coin tester provided by the present invention completely unique—because no prior coin tester has ever been able to separate those coins.

The speed at which a coin or slug passes through the slot 66 in the printed circuit board 64 has no ascertainable effect upon the ability of the electronic coin tester of FIG. 2 to accept or reject that coin or slug; and this is very desirable. This is due to the fact that the electromagnetic resonant frequencies of coins are so very high—being in or close to the gigahertz range—that each coin and slug will be exposed to millions of cycles of the normal resonant frequency of the parallel-resonant tuned circuit 53 before that coin or slug can pass through the coil 54—regardless of how fast that coin or slug is moving. For example if a ten pfennig German Democratic Republic coin was projected completely through the slot 66 in the printed circuit board 64 in less than one-hundredth of a second, that coin would still be subjected to thirteen million, three hundred and fifty thousand cycles of the normal resonant frequency of the parallel-resonant tuned circuit 53. An acceptable ten pfennig German Democratic Republic coin can be caused to resonate at its electromagnetic resonant frequency by as few as ten thousand cycles of the normal resonant frequency of the parallel-resonant tuned circuit 53; and hence such a coin could be caused to resonate at its electromagnetic resonant frequency even if it was hurtled through the slot 66 in the printed circuit board 64 in one-hundredth of a millisecond. As a result, the electronic coin tester of the present invention, unlike most prior coin testers, can distinguish between acceptable coins and slugs and unacceptable coins regardless of the rate at which those coins and slugs pass through that electronic coin tester.

One of the differences between the embodiment of electronic coin tester shown in FIG. 1 and the embodiment of electronic coin tester shown in FIG. 2 is the use, in the latter embodiment, of the parallel-resonant tuned circuit 43. That parallel-resonant tuned circuit is not essential, and it could be deleted from the embodiment of electronic coin tester shown in FIG. 2 by rearranging the positions and values of the other components of that embodiment of electronic coin tester; but that parallel-resonant tuned circuit is desirable because it increases the sensitivity of that embodiment of electronic coin tester.

Another difference between the embodiment of electronic coin tester shown in FIG. 1 and the embodiment of electronic coin tester shown in FIG. 2 is the dual function performed by the parallel-resonant tuned circuit 53 shown in FIG. 2. That parallel-resonant tuned circuit not only supplies the energy to the inserted coins which enables acceptable coins to resonate at their electromagnetic resonant frequencies, but it also coacts with the electromagnetically resonating acceptable coins to develop electrical variations which can be sensed.

Whereas the drawing and accompanying description have shown and described two preferred embodiments of the present invention, it should be apparent to those skilled in the art that various changes may be made in the form of the invention without affecting the scope thereof.

What we claim is:
1. A coin-testing device which comprises:
   (a) a coil disposed adjacent a path for coins which develops an electromagnetic field that extends into said path for coins and affects coins passing through said path for coins,
   (b) a second coil disposed adjacent said path for coins which senses electromagnetic resonant frequencies developed by coins within said path for coins,
   (c) a resonant circuit that includes the first said coil and that resonates at a predetermined frequency and causes said electromagnetic field, developed by the first said coil within said path for coins, to resonate at said predetermined frequency,
   (d) the first said coil causing a coin which is moving along said path for coins and which has the electromagnetic resonant frequency thereof close to said predetermined frequency to start resonating at its electromagnetic resonant frequency,
   (e) said second coil responding to a coin, which is within said path for coins and which passed through the electromagnetic field developed in said path for coins by the first said coil and which was caused to resonate at its electromagnetic resonant frequency by said electromagnetic field from the first said coil, to provide electrical variations, and
   (f) means connected to said second coil to respond to said electrical variations, and thereby indicate that an electromagnetically resonating coin is adjacent said second coil.

2. A coin-testing device as claimed in claim 1 wherein said resonant circuit includes a capacitor that is connected in parallel with the first said coil to form a parallel-resonant tuned circuit.

3. A coin-testing device as claimed in claim 1 wherein said electrical variations provided by said second coil cause the voltage drop across the first said coil to change and wherein a network is interposed between the first said coil and a utilization circuit to couple the voltage drop across the first said coil to said utilization circuit.

4. A coin-testing device as claimed in claim 1 wherein said electrical variations provided by said second coil cause the voltage drop across the first said coil to change and wherein a network is interposed between the first said coil and a utilization circuit to couple the voltage drop across the first said coil to said utilization circuit, said network including diodes of a voltage doubler.

5. A coin-testing device as claimed in claim 1 wherein said means includes an amplifier which has the first said coil at the output thereof and which has said second coil at the input thereof.

6. A coin-testing device as claimed in claim 1 wherein said means includes an amplifier and wherein said resonant circuit is connected to said amplifier to enable said amplifier to operate as an oscillator.

7. A coin-testing device as claimed in claim 1 wherein said means includes a transistor and wherein said second coil is connected in the base-emitter circuit of said transistor.

8. A coin-testing device as claimed in claim 1 wherein said resonant circuit includes a capacitor that is connected in parallel with the first said coil to form a parallel-resonant tuned circuit, wherein said means includes an amplifier, and wherein a second capacitor connects the first said capacitor across said amplifier to enable said amplifier to operate as an oscillator.

9. A coin-testing device as claimed in claim 1 wherein said means responds to said electrical variations to change the amplitude of oscillations in the first said coil, said electrical variations caused by a coin resonating at an electromagnetic resonant frequency close to said predetermined frequency or a harmonic thereof coacting with said means to change the amplitude of oscillations in the first said coil in a predetermined manner, said electrical variations caused by a coin resonating at an electromagnetic resonant frequency substantially different from said predetermined frequency or a harmonic thereof coacting with said means to change the amplitude of oscillations in the first said coil in a manner opposite to said predetermined manner.

10. A coin-testing device as claimed in claim 1 wherein the first said coil supplies substantially no energy directly to said second coil but transfers energy to coins to cause said coins to resonate and the resonating coins then transfer energy to said second coil.

11. A coin-testing device as claimed in claim 1 wherein said second coil is arranged to receive no energy directly from the first said coil.

12. A coin-testing device as claimed in claim 1 wherein said coils are disposed adjacent said path so a coin successively passes the first said coil and then passes said second coil.

13. A coin-testing device which comprises:
a coil disposed adjacent a path for coins which develops an electromagnetic field that extends into said path for coins and affects coins passing through said path for coins,
a resonant circuit that includes said coil and that resonates at a predetermined frequency and causes said electromagnetic field, developed by said coil within said path for coins, to resonate at said predetermined frequency,
said predetermined frequency being close to the electromagnetic resonant frequency of a coin of predetermined denomination to be accepted by said coin-testing device,
said resonant circuit causing said coin of said predetermined denomination, as it moves past said coil, to start resonating at its electromagnetic resonant frequency while said coin is adjacent said coil, and
means responsive to an electromagnetically resonating coin to develop electrical variations which indicate that a coin has been caused to resonate at its electromagnetic resonant frequency and that said electromagnetic resonant frequency is close to said predetermined frequency of said resonant circuit.

14. A coin-testing device as claimed in claim 13 wherein said predetermined frequency of said resonant circuit is higher than said electromagnetic resonant frequency of said coin of predetermined denomination.

15. A coin-testing device as claimed in claim 13 wherein said predetermined frequency of said resonant circuit is in the gigahertz range and wherein said electromagnetic resonant frequency is in the gigahertz range.

16. A coin-testing device as claimed in claim 13 wherein said coil is a quarter-wave length element.

17. A coin-testing device as claimed in claim 13 wherein an oscillator normally supplies energy to said resonant circuit to keep said resonant circuit resonating at said predetermined frequency.

18. A coin-testing device as claimed in claim 13 wherein said resonant circuit responds to an electromagnetically resonating coin adjacent said coil to change the impedance of said resonant circuit.

19. A coin-testing device as claimed in claim 13 wherein an oscillator normally supplies energy to said resonant circuit to keep said resonant circuit resonating at said predetermined frequency and wherein said resonant circuit responds to an electromagnetically resonating coin adjacent said coil to change the impedance of said resonant circuit and thereby enable said resonant circuit to affect the impedance of said oscillator.

20. A coin-testing device which comprises:
a coil disposed adjacent a path for coins which develops an electromagnetic field that extends into said path for coins and affects coins passing through said path for coins,
a resonant circuit that includes said coil and that resonates at a predetermined frequency and causes said electromagnetic field, developed by said coil within said path for coins, to resonate at said predetermined frequency,
said predetermined frequency being close to the electromagnetic resonant frequency of a coin of predetermined denomination to be accepted by said coin-testing device,
said resonant circuit causing said coin of said predetermined denomination, as it moves past said coil, to start resonating at its electromagnetic resonant frequency while said coin is adjacent said coil,
said resonant circuit then responding to said electromagnetically resonating coin to experience a change in the electrical characteristics thereof, and
a circuit which responds to said changes in the said electrical characteristics of said resonant circuit to develop electrical variations which indicate that an electromagnetically resonating coin is adjacent said coil.

21. A coin-testing device as claimed in claim 20 wherein said coil is a quarter-wave length element.

22. The method of separating an acceptable coin from slugs and unacceptable coins which comprises:
applying energy to inserted coins and slugs in the form of an electromagnetic field which oscillates at a predetermined frequency close to the electromagnet resonant frequency of said acceptable coin,
applying an amount of said energy to said coins and slugs great enough to cause said acceptable coin to start resonating at its electromagnetic resonant frequency,
sensing the resonating of said acceptable coin at its electromagnetic resonant frequency, and
responding to the resonating of said acceptable coin at its electromagnetic resonant frequency to develop detectable electrical variations.

23. The method of separating an acceptable coin from slugs and unacceptable coins as claimed in claim 22 wherein said predetermined frequency is higher than said electromagnetic resonant frequency of said acceptable coin.

24. The method of separating an acceptable coin from slugs and unacceptable coins which comprises:
applying energy to inserted coins and slugs in the form of an electromagnetic field which oscillates at a predetermined frequency close to the electromagnetic resonant frequency of said acceptable coin,
applying an amount of said energy to said coins and slugs great enough to cause said acceptable coin to start resonating at its electromagnetic resonant frequency, and
absorbing part of the energy emitted by said acceptable coin, as said acceptable coin resonates at its electromagnetic resonant frequency, to develop detectable electrical variations.

References Cited

UNITED STATES PATENTS 3,152,677 10/1964 Phillips _____ 194—100
3,378,126 4/1968 Kuckens et al. _____ 194—100

STANLEY H. TOLLBERG, Primary Examiner